March 25, 1952
L. D. JAMISON
2,590,178
COMBINATION CONVERTIBLE GOLF CLUB
AND EQUIPMENT CASE AND CART
Filed Nov. 29, 1950
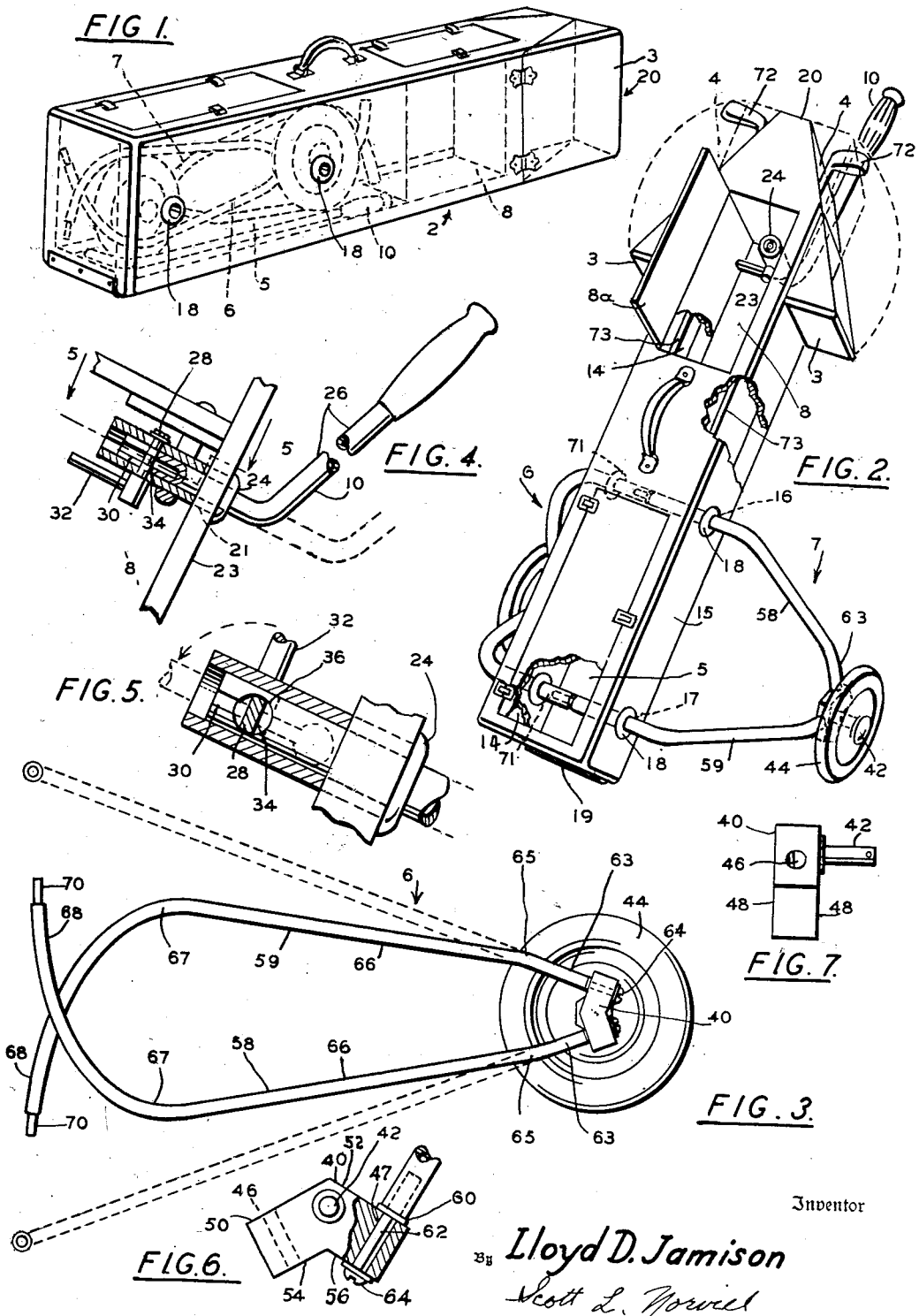
Inventor
Lloyd D. Jamison
Scott L. Norvell
Attorney Patented Mar. 25, 1952

2,590,178

UNITED STATES PATENT OFFICE 2,590,178

COMBINATION CONVERTIBLE GOLF CLUB AND EQUIPMENT CASE AND CART

Lloyd D. Jamison, Phoenix, Ariz.

Application November 29, 1950, Serial No. 198,212

3 Claims. (Cl. 280—37)

This invention pertains to a combination convertible golf club and equipment case, and cart.

One of the objects of the invention is to provide a light rigid rectangular case, adapted to carry a set of golf clubs and other equipment, with foldable wheel brackets which when attached, convert the case into a golf club cart, and when desired may be removed from the outside of the case, folded, and stored within the case;

Another object is to provide a rigid case adapted to hold golf clubs, or the like, with means for attachment of laterally disposed outwardly extending, foldable wheel frames, and with means for storing said wheel frames and the wheels thereon, within the case when desired;

Another object is to provide wheel frames for golf cart wheels which may be folded to occupy a small space or unfolded and attached to a rigid golf club case to provide wheeled support therefor;

Another object is to provide a rigid golf club case with means for attaching said wheel frames on its outside, and for storing them within a portion thereof when desired;

A further object is to provide a handle with mechanism cooperative with a socket in the case for attaching it rigidly in extended position on the outside of the case and means for quickly and easily detaching and storing it within said case;

Still another object is to provide a form, shape, style and arrangement of said parts so that they may be easily and cheaply manufactured and so that they will be strong, long wearing and foolproof in use;

Other objects will appear hereinafter.

I attain the foregoing objects by means of the devices, structure and combination of parts shown in the accompanying drawings in which—

Figure 1 is a perspective view of the golf club and equipment case, as it appears closed and with the wheeled supports and handle stowed therewithin;

Figure 2 is a perspective view of the case with the wheeled supports attached to the outside of the case and with the cart handle attached;

Figure 3 is an elevational view of one of the wheel supports with the movements of the supporting struts indicated in dotted lines;

Figure 4 is a section of a fragment of the forepart of the case showing the cart handle and its attachment mechanism;

Figure 5 is a sectional view taken substantially on line 5—5, Figure 4, drawn on an enlarged scale and showing details of the handle attaching mechanism;

Figure 6 is a side elevation of a wheel supporting block; and

Figure 7 is an end view thereof.

Similar numerals refer to similar parts in the several views.

In the drawings, 2 indicates in general a light rectangular shaped case made of laminated wood fiber, light metal or the like, which has two laterally hinged, triangularly shaped end closure lids 3 which cover two laterally disposed compartments 4, adapted to receive golf clubs, a centrally positioned compartment 5, in its lower portion adapted to receive the foldable wheel supports 6 and 7, hereinafter described, and a centrally positioned compartment 8, in its upper portion adapted to hold golf equipment and afford access to the cart handle attachment 10, hereinafter described.

Each of the sides 14 and 15 of case 2 are provided with holes 16 and 17 in which thimbles 18 are set. Thimble holes 16 are oppositely positioned in the vertical center of the sides and slightly toward the lower end from the longitudinal center of the case, holes 17 are oppositely positioned just short of the lower end 19 of the case.

A hole 21 is provided in the bottom 23 of case 2 near its upper end 20. This is fitted with thimble 24 which extends into compartment 8 and is adapted to receive and hold handle 10. In order to hold handle 10 firmly, and maintain the outer, upwardly bent portion 26 in the upward position desired, thimble 24 is provided with a rotatable transverse locking pin 28. This pin may be rotated by radially extending handle 32 which is reached through access door 8a, of compartment 8, into which the thimble extends. The inserted end of handle 10 has a slot 30 in a plane coinciding with the outer upwardly bent portion 26. At the inner end of this slot there is a round hole 36 of the same size as locking pin 28. Slot 30 is narrower than the diameter of pin 28 which has a flattened portion at 34 to fit into the slot when the flat is turned edgewise to the slot as shown in Figure 4. Handle 32 may then extend parallel with the inner portion of handle 10. After the handle is inserted all the way into socket 24 with the pin 28 resting in the hole 36 at the bottom of slot 30, locking pin 28 may be turned 90° by means of handle 32 and the flattened portion 34 will then be at right angles to the slot and will lock it in place, and prevent its withdrawal as shown in Figure 5. The engagement of pin 28 in slot 30 maintains the outer portion 26 of handle 10 in an upwardly extending position, and rotation of locking pin 28 secures it in position.

Foldable wheel supports 6 and 7 are constructed substantially alike. In use, however, they are attached to case 2, as right and left counterparts. Each wheel support consists of two struts, 58 and 59 and a coupling block 40. From one side of each block a stub axle 42 extends horizontally to journal wheel 44. Two holes 46 and 47 are formed in the block with their axis in a vertical plane at right angles to the axis of axle 42. Transversely viewed (Figure 6) the axis of these holes diverge upwardly from the center of the block. Block 40 is formed with a side elevation having the shape of an inverted V. While its side faces 48 are vertical and parallel, its top and bottom faces are angularly disposed, relative to each other, on each side of the longitudinal center of the block, upper face 50 and lower face 54 are parallel and face 52 and 56 are likewise parallel. Holes 46 and 47 are drilled in approximately the center of each end portion of the block at right angles to the upper and lower faces thereon. Struts 58 and 59 are provided at their lower ends, with shoulders 60 having pins 62 extending axially outward. These pins have a running fit in holes 46 and 47 of each block and are retained in these holes by screws 64 screwed axially into the ends of said pins. Each strut may be rotated relative to the block 40 in which it is supported, about an axis coinciding with that of its end pin 62.

Each strut is formed with a bottom shank portion 63 alined with its attaching pin 62. At the upper end of this portion there is a bend 65 which directs the mid-portion 66 of the strut upwardly and inwardly. Above the mid-portion 66 there is a bend 67 of comparatively large radius and in the same plane as bend 65, which directs the upper end portion 68 of the strut horizontally and at right angles to lower shank portion 63. The struts on the wheel support 7, to be used on one side of the cart are provided with pins 70 which fit into sockets 71 at the upper ends of the struts of the opposite wheel support 6. When the upper portions 68 of support 7 are inserted in thimbles 18 on one side of case 2, their pins 70 will fit into the sockets of the struts of wheel support 6. The upper portions 68 of each strut will extend directly outward from the case, their mid-portions will extend angularly outward and downward, away from the side of the case, and the lower end portions 63 will extend in a vertical plane parallel with the side of the case. The wheel axles 42 will then be horizontal.

When the wheel supports are removed from the attached position shown in Figure 2, the struts 58 and 59 may be rotated approximately 90° in block 40 so that their upper portions are directed inward, toward each other, as shown in Figure 3. Bends 65 direct the mid and upper parts inward, toward each other, and bends 67 cause the ends 68 to be directed toward each other and to overlap. The supports are then in a folded condition and occupy a space small enough so that they may be placed in case compartment 5 as indicated by dotted lines in Figure 1. Golf clubs 72 are placed in laterally disposed compartments 4 with their heads occupying the space closed by lids 3 and with their handles 73 extending into compartment spaces between the outer side walls of case 2 and the sides of compartments 8 and 5. Other equipment may be stored in compartment 8. When the wheel supports are dismounted and stowed, and lids 4 and 8a closed, the case appears as shown in Figure 1. When the wheel supports are extended and attached and lids 4 opened the case appears as in Figure 2, and is ready for use. In this position the wheels 44 are positioned far enough forward so that they will support the case in an angular upwardly extending position while the rear end 19 rests on the ground. The handle is attached as above explained. When it is desired to roll the case as a cart, handle 10 is grasped and lowered somewhat so that case end 20 is lowered and end 19 raised to clear the ground. The case may then be drawn or pushed as desired.

From the foregoing it will be understood by those familiar with the art that I have provided a case which is neat in appearance, substantially constructed and will act as a container for the wheel supports and handle when desired or as a rigid body for a golf cart when the wheels and handle are attached to the outside.

Since many modifications are possible I wish to be limited only by the claims.

I claim:

1. A combination golf club case and cart, comprising in combination, a rigid rectangular case, laterally disposed longitudinally extending compartments therein adapted to contain golf culbs, a centrally disposed compartment adapted to receive folded wheel supports, spaced openings oppositely positioned in the lower portion of the sides of said case to receive and removably retain the upper ends of the struts of wheel supports, an opening in the upper end portion of the bottom of said case provided with a cart handle receiving thimble; a pair of wheel supporting struts each including a block with a projecting wheel spindle, a wheel thereon, and struts extending therefrom having their upper ends curved to extend at right angles to their lower portions and pivotally mounted in said block so as to pivot from a folded position with their upper ends directed toward each other, to an extended position with their upper ends directed from and extending parallel to said wheel spindle, removably attached to said case by insertion of the upper ends of said struts, when in extended position into the spaced openings in the sides of said case with the ends of said upper portions of each oppositely positioned strut mutually engaging to maintain rigidity, and a cart handle having an upturned outer end removably retained in said thimble in the bottom of said case.

2. A combination golf club case and cart, comprising in combination, a rigid elongated case having flat sides and interiorly disposed compartments for receiving golf clubs and folded wheel supports, two longitudinally spaced thimbles, positioned within an end portion of each of said flat sides to receive the upper ends of foldable wheel supporting struts in mating position, and a pair of foldable wheel supports each consisting of a wheel block having top and bottom surfaces angularly disposed longitudinally from the block center, strut sockets extending through end portions of said block at right angles to said top and bottom faces with their axes diverging upwardly from the center of said blocks, wheels journalled on spindles projecting laterally from said block, a pair of struts having their lower ends journalled in said strut sockets so that the lower end portions are disposed to extend upwardly therefrom, having a bend near the lower end directing the mid-portion thereof at an angle relative to the lower portion and a bend at the upper portion thereof directing the upper end portion at right angles to the lower end portion; said upper ends of each pair of struts of each wheel support being attached to said case by insertion of the upper ends thereof into the sockets on each side of said case with the ends of the oppositely positioned struts of the opposite wheel supports mutually joined.

3. A foldable wheel support for a golf cart having a rigid body with flat oppositely disposed sides having spaced sockets, consisting of a coupling block having a laterally extending stub wheel axle and strut sockets disposed near the longitudinal ends thereof with their axes diverging upward, a pair of struts having their lower ends pivotally mounted in said sockets and their lower portions extending from said sockets in axially alined relation, a bend in said lower portion directing the mid-portion of each strut at a slight angle relative to the said lower portion, and a bend near the upper end in the same plane as the bend in the lower portion directing the upper end portion at right angles relative to said lower portion.

LLOYD D. JAMISON.

REFERENCES CITED

The following references are of record in the file of this patent:

UNITED STATES PATENTS

| Number | Name | Date |
|---|---|---|
| 2,470,272 | Trimmer | May 17, 1949 |
| 2,480,597 | Nelson | Aug. 30, 1949 |
| 2,551,009 | Kaltenbach | May 1, 1951 |